(12) United States Patent
Chow

(10) Patent No.: US 6,202,098 B1
(45) Date of Patent: Mar. 13, 2001

(54) METHOD AND SYSTEM FOR OBJECT ORIENTED NOTIFICATION

(75) Inventor: ChungHen Chow, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/368,189

(22) Filed: Jan. 4, 1995

(51) Int. Cl.$^7$ .............................. G06F 9/00; G06F 9/46; G06F 15/163

(52) U.S. Cl. ........................................... 709/315

(58) Field of Search ................................... 395/700, 680, 395/683; 709/300

(56) References Cited

U.S. PATENT DOCUMENTS

| | | | |
|---|---|---|---|
| 4,951,225 | * 8/1990 | Lee et al. . | |
| 5,133,075 | * 7/1992 | Risch . | |
| 5,142,663 | * 8/1992 | Janis et al. . | |
| 5,155,850 | * 10/1992 | Janis et al. . | |
| 5,161,223 | * 11/1992 | Abraham . | |
| 5,173,853 | * 12/1992 | Kelly, et al. . | |
| 5,265,206 | * 11/1993 | Shackelford et al. | 395/200 |
| 5,321,837 | * 6/1994 | Daniel et al. | 395/604 |
| 5,339,430 | * 8/1994 | Lundin et al. . | |
| 5,410,702 | * 4/1995 | Abraham et al. | 709/300 |
| 5,432,925 | * 7/1995 | Abraham et al. | 395/680 |
| 5,497,491 | * 3/1996 | Mitchell et al. | 709/300 |
| 5,515,536 | * 5/1996 | Corbett et al. . | |
| 5,566,337 | * 10/1996 | Szymanski et al. | 395/733 |

FOREIGN PATENT DOCUMENTS

| | | |
|---|---|---|
| 0 575 073 A2 | 12/1993 | (EP) . |
| 06-324859 | 11/1994 | (JP) ................. G06F/9/06 |

OTHER PUBLICATIONS

Swaine, Michael; "Programming Paradigms", Dr. Dobb's Journal on CD–ROM; pp. 1–6, Apr. 1994.*
Betz, David; "A Taste of Dylan", Dr. Dobb's Journal on CD–ROM; pp. 1–7, Oct. 1992.*
Ford, Dan; "Associations in C+ +", Dr. Dobb's Journal on CD–ROM; pp. 1–9, Aug. 1994.*
Floyd, Michael; "Roll your own object–oriented language"; Dr. Dobb's Journal on CD–ROM; pp. 1–19, Nov. 1990.*
*Class Objects in SOM*, Nurcan Coskun & Roger Sessions, IBM Personal Systems Developer (Summer 92), pp. 67–77.*
*Object–Oriented Programming in OS/22.0*, Roger Sessions & Nurcan Coskun, IBM Personal Systems Developer (Winter 92) pp. 107–119.*
Karel Driesen, "Selector Table Indexing", ACM Sigplan Notices, vol. 28, No. 10, Oct. 1993, pp. 259–270, New York.

(List continued on next page.)

Primary Examiner—Alvin E. Oberley
Assistant Examiner—P. G. Caldwell
(74) Attorney, Agent, or Firm—Jeffrey S. LaBaw; Felsman, Bradley, Vaden, Gunter & Dillon, LLP (57) ABSTRACT

A method and system for invoking a subroutine from within an object and an object oriented system. The object oriented system is executing on a data processing system and includes a plurality of subroutines and classes. A subroutine may be called from within the object using an address for the subroutine. Callback arrays are employed within the object, wherein each callback array belongs to different class within the plurality of classes. Additionally, each object includes at least one slot identified by an integer. Each slot includes an address for one of the subroutines. A class identifier is accepted to identify one of the callback arrays within the object. An integer is employed to select a slot within the array identified by the class identifier. The address located within the selected slots of the identified array is employed to call a subroutine, wherein the complexity of managing callbacks are reduced.

11 Claims, 9 Drawing Sheets

OTHER PUBLICATIONS

Pascal Andre and Jean–Claude Royer, "Optimizing Method Search With Lookup Caches and Incremental Coloring", ACM Sigplan Notices, vol. 27, No. 10, Oct. 1992, pp. 110–126, New York.

G. Caal, A. Divin and C. Petitpierre, "Active Objects: A Paradigm for Communications and Event Driven Systems" IEEE Globecom, vol. 1, Nov. 1994, pp. 485–489, San Francisco.

* cited by examiner

```
Interface Foo {
  attribute somMethodPtr fooCB[5];
  ...
};

Interface Bar {
  attribute somMethodPtr barCB[3];
  ...
};

Interface FooBar {
  attribute somMethodPtr foobarCB[4];
  ...
};
```

```
// The registration and invocation define CBRegister(instance, CBClass, CBName, CBAddress)\
    _get_ ## CBClass ## CB(instance, ev)[ CBName ] = CBAddress define CBInvoke(instance, CBClass, CBName)\
    (_get_ ## CBClass ## CB(instance, ev)[ CBName ]()
```

```
// Definition of the names of the callbacks together with Foo class
// declaration define FooCBName1    0
define FooCBName2    1
#define FooCBName3    2
#define FooCBName4    3
#define FooCBName5    4
```

```
// Definitions of the callback names in other classes define BarCBName.. ....
...
```

*Fig. 11*

```
// The registration of the address and name to the instance
// this is on client side.
...
CBRegister(foobar, Foo, FooCBName1, AddressOfCBName1);
...
```

Fig. 12

```
// In server or the implementation of the Foo class
// this is on server side.
...
CBInvoke(somSelf, Foo, FooCBName1);
...
```

Fig. 13

METHOD AND SYSTEM FOR OBJECT ORIENTED NOTIFICATION

CROSS-REFERENCE TO RELATED APPLICATIONS

The present application contains subject matters related to co-pending application Ser. No. 08/375,149 abandoned, now continuation application Ser. No. 08/941,323, filed Sep. 30, 1997, entlited METHOD AND SYSTEM FOR LOGICAL EVENT MANAGEMENT, filed on even data herewith and assigned to the assignee hereof and incorporated by reference herein.

BACKGROUND OF THE INVENTION

1. Technical Field

The present invention relates generally to data processing systems and more particularly to data processing systems for creating application programs or operating system programs. Still more particularly, the present invention relates to a callback mechanism for object oriented systems.

2. Description of the Related Art

The development of application and system software for data processing systems has traditionally been a time consuming task. The field of software engineering has attempted to overcome the limitations of traditional techniques by proposing new, more efficient software development models. Object oriented programming has emerged as a promising technology that will allow rapid development, implementation and customization of objects. Each new object has certain data attributes and processes or methods that operate on that data. Data is said to be "encapsulated" by an object and can only be modified by the object methods are invoked by sending a message to an object identifying the method and supplying any needed arguments.

Object oriented systems have two important properties in addition to encapsulation. "Inheritance" is the ability to derive a new object from an existing object and inherit all properties, including methods and data structure, from the existing object. The new object may have certain unique features which are supplied as overrides or modifications to the existing class. For example, a new subclass needs to specify only the functions and data that distinguish that class from the existing more general class.

The ability to override an existing method description enables polymorphism, the ability to have a single message to an object be processed in different ways depending on the object itself.

Inheritance and polymorphism create a powerful structure for implementing new software systems. The software developer does not have to develop each piece of a system, he or she need only specify the unique features of the system.

The power of object oriented systems is realized through the development of system "frameworks." A framework is a collection of base classes that can be used by a system implementor to create a final systems product. The framework is defined and developed to work together as a system. Conceptually, the framework is much like a set of standard hardware components used by computer hardware builders. Each of the components has certain defined functions and interfaces and the engineer assembles these components according to a particular design to create a unique hardware system.

One object oriented programming system is the System Object Model (SOM). More information on SOM can be found in SOMObjects Developer Toolkit User's Guide, version 2.0, June 1993, available from International Business Machines Corporation. More information on object oriented systems and definite terms specific to object oriented systems may be found in Booch, Object Oriented Design With Applications, Benjamin/Cummings Publishing Company, Inc. (1991).

A notification mechanism is a widely used technique in programming to dynamically invoke an operation or procedure that is only available during runtime. Typically, a combination of a hash table and a callback list a are commonly used implement a notification mechanism. A hash table is a table of information that is accessed by way of a shortened search key (a hash value or key). Elements are stored in a table in which each element also includes a unique key. An element is placed in the table by the value returned by the hash function over the unique key. The key may be a string, a pointer address, an integer, or any unique identity. A hash function maps this unique identity to an integer value within the size of the table. Once the element is placed in the keyed position in the table, the element can be retrieved from the array in the same manner that it was placed in the table. A linked list, also called a "chained list", is a list in which the data elements may be disbursed and each data element contains information for locating the next data element. In a linked list, each element has a unique key for retrieval.

The overhead for employing a hash table, however, is typically too high for simple objects. At run time, table look up also introduces performance degradation. In addition, when notifications are introduced by a number of super classes in a multiple, inheritance object oriented environment, the management of notification in the hash table can become extremely complicated. A hash table also is larger than a linked list containing the same amount of elements to avoid key collision. The hash function must be well designed to avoid collision between the hashed key. A collision results in employing a linked list to store the collided elements sharing the same position. A linked list reduces the speed of retrieval of elements when the list size grows. This degradation is caused by the fact that elements on the list must be traversed one by one in order to find the target or desired element.

A callback mechanism is used in notification in procedural programming to allow an existing software module to call subroutines that are only available during run time. The invocation of the run time subroutine is called a "callback". The subroutine is called a "callback procedure". The existing software module learns of the existence of a callback procedure through a registration routine, which requires the name of the invocation and the address of the callback procedure. The registration information is typically placed into a hash table so that the address of the callback procedure can be quickly retrieved by using the name of the invocation as a hash key. The name, however, is usually a text string and time is required to convert a text string, into a hash key.

As a result, the invocation of a callback procedure with the existing software module is slower than a direct subroutine invocation. In addition, when the number of callback names grows, it becomes hard to manage the names logically. Consequently, it becomes harder and harder for a programmer to employ a callback mechanism. Therefore, it would be advantageous to have an improved callback mechanism that is fast and easy to manage.

SUMMARY OF THE INVENTION

It is one object of the present invention to provide an improved data processing system.

It is another object of the present invention to provide an improved data processing systems for creating application programs or operating system programs.

It is yet another object of the present invention to provide a callback mechanism for object oriented systems.

The present invention provides a method and system for invoking a subroutine from within an object and an object oriented system. The object oriented system is executing on a data processing system and includes a plurality of subroutines and classes. A subroutine may be called from within the object using an address for the subroutine. Callback arrays are employed within the object, wherein each callback array belongs to different class within the plurality of classes. Additionally, each object includes at least one slot identified by an integer. Each slot includes an address for one of the subroutines. A class identifier is accepted to identify one of the callback arrays within the object. An integer is employed to select a slot within the array identified by the class identifier. The address located within the selected slots of the identified array is employed to call a subroutine, wherein the complexity of managing callbacks are reduced.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
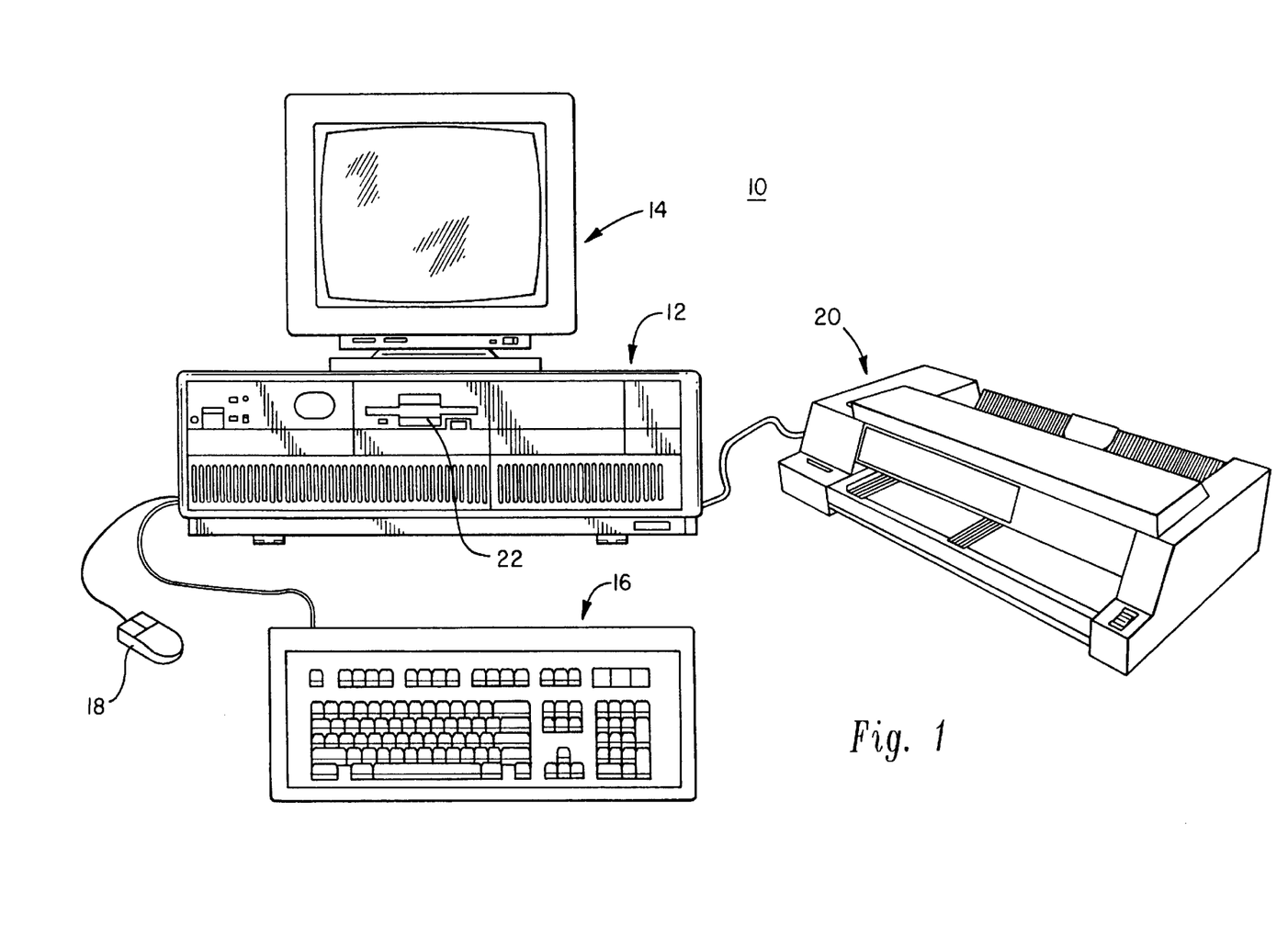
FIG. 1 depicts a data processing system in the form of a personal computer in which the present invention can be employed is depicted.

Referring now to the figures, and in particular to FIG. 1, a data processing system, personal computer system 10, in which the present invention can be employed is depicted. As shown, personal computer system 10 comprises a number of components, which are interconnected together. More particularly, a system unit 12 is coupled to and can drive an optional monitor 14 (such as a conventional video display). A system unit 12 also can be optionally coupled to input devices such as a PC keyboard 16 or a mouse 18. Mouse 18 includes right and left buttons (not shown). The left button is generally employed as the main selector button and alternatively is referred to as the first mouse button or mouse button 1. The right button is typically employed to select auxiliary functions as explained later. The right mouse button is alternatively referred to as the second mouse button or mouse button 2. An optional output device, such as a printer 20, also can be connected to the system unit 12. Finally, system unit 12 may include one or more mass storage devices such as the diskette drive 22.

As will be described below, the system unit 12 responds to input devices, such as PC keyboard 16, the mouse 18, or local area networking interfaces. Additionally, input/output (I/O) devices, such as floppy diskette drive 22, display 14, printer 20, and local area network communication system are connected to system unit 12 in a manner well known. Of course, those skilled in the art are aware that other conventional components also can be connected to the system unit 12 for interaction therewith. In accordance with the present invention, personal computer system 10 includes a system processor that is interconnected to a random access memory (RAM), a read only memory (ROM), and a plurality of I/O devices.

In normal use, personal computer system 10 can be designed to give independent computing power to a small group of users as a server or a single user and is inexpensively priced for purchase by individuals or small businesses. In operation, the system processor functions under an operating system, such as IBM's OS/2 operating system or DOS. OS/2 is a registered trademark of International Business Machines Corporation. This type of operating system includes a Basic Input/Output System (BIOS) interface between the I/O devices and the operating system. BIOS, which can be stored in a ROM on a motherboard or planar, includes diagnostic routines which are contained in a power on self test section referred to as POST.

Figure 2:
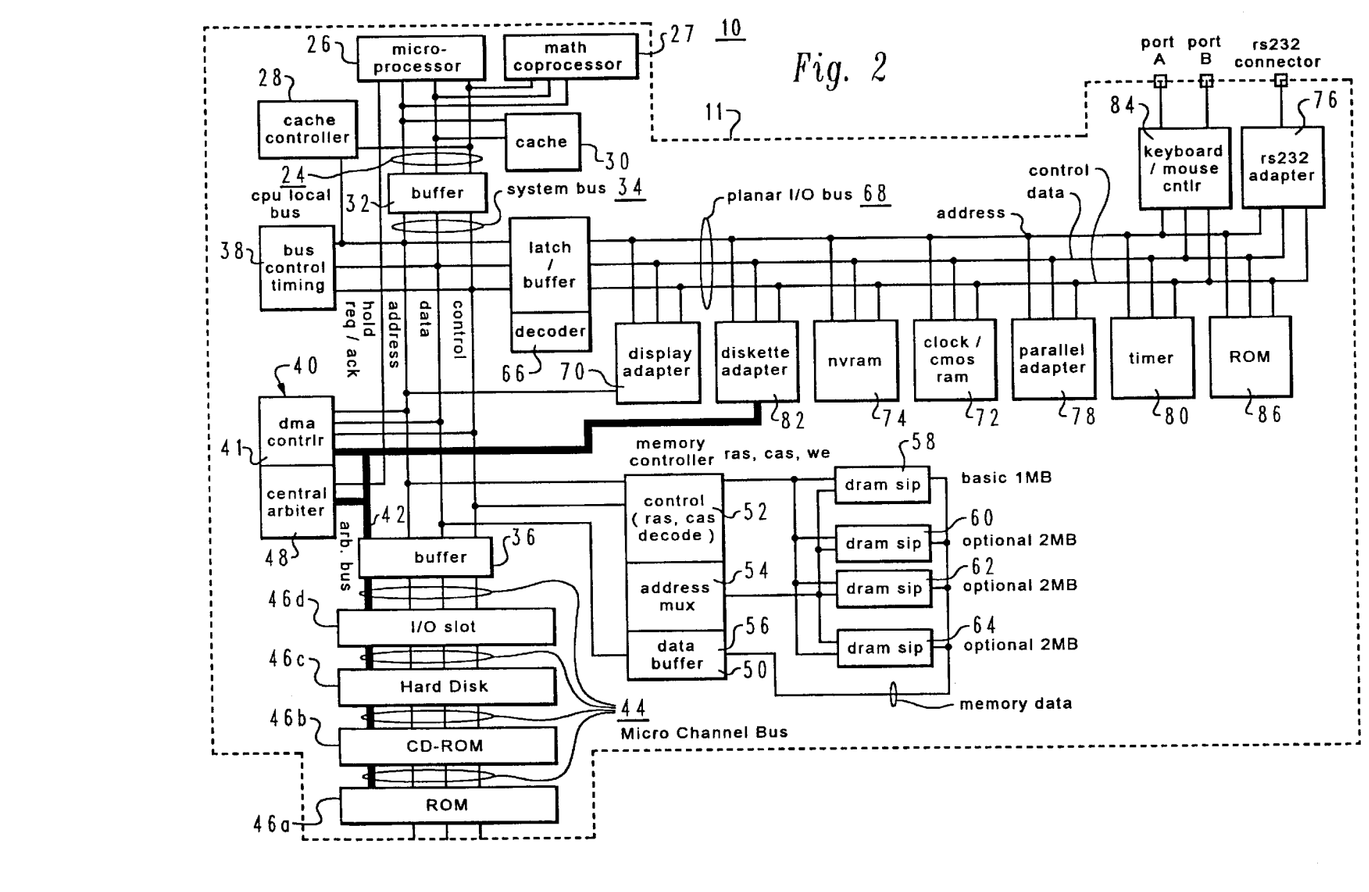
FIG. 2 is a block diagram of a personal computer system illustrating the various components of personal computer system in accordance with the present invention.

Prior to relating the above structure to the present invention, a summary of the operation in general of personal computer system 10 may merit review. Referring to FIG. 2, there is shown a block diagram of personal computer system 10 illustrating the various components of personal computer system 10 in accordance with the present invention. FIG. 2 further illustrates components of planar 11 and the connection of planar 11 to I/O slots 46a–46d and other hardware of personal computer system 10. Connected to planar 11 is the system central processing unit (CPU) 26 comprised of a microprocessor which is connected by a high speed CPU local bus 24 through a bus controlled timing unit 38 to a memory control unit 50 which is further connected to a volatile random access memory (RAM) 58. While any appropriate microprocessor can be used for CPU 26, one suitable microprocessor is the Pentium microprocessor, which is sold by Intel Corporation. "Pentium" is a trademark of Intel Corporation.

While the present invention is described hereinafter with particular reference to the system block diagram of FIG. 2, it is to be understood at the outset of the description which follows, it is contemplated that the apparatus and methods in accordance with the present invention may be used with other hardware configurations of the planar board. For example, the system processor could be an Intel 80286, 80386, or 80486 microprocessor. These particular microprocessors can operate in a real addressing mode or a protected addressing mode. Each mode provides an addressing scheme for accessing different areas of the microprocessor's memory.

Returning now to FIG. 2, CPU local bus 24 (comprising data, address and control components) provides for the connection of CPU 26, an optional math coprocessor 27, a cache controller 28, and a cache memory 30. Also coupled on CPU local bus 24 is a buffer 32. Buffer 32 is itself connected to a slower speed (compared to the CPU local bus) system bus 34, also comprising address, data and control components. System bus 34 extends between buffer 32 and a further buffer 36. System bus 34 is further connected to a bus control and timing unit 38 and a Direct Memory Access (DMA) unit 40. DMA unit 40 is comprised of a central arbitration unit 48 and a DMA controller 41. Buffer 36 provides an interface between the system bus 34 and an optional feature bus such as the Micro Channel bus 44. "Micro Channel" is a registered trademark of International Business Machines Corporation. Connected to bus 44 are a plurality of I/O slots 46a–46d for receiving Micro Channel adapter cards which may be further connected to an I/O device or memory. In the depicted example, I/O slot 46a has a hard disk drive connected to it; I/O slot 46b has a CD-ROM drive connected to it; and I/O slot 46c has a ROM on an adapter card connected to it. Other devices, such as a modem may be connected to an I/O slot. An arbitration control bus 42 couples the DMA controller 41 and central arbitration unit 48 to I/O slots 46 and diskette adapter 82. Also connected to system bus 34 is a memory control unit 50 which is comprised of a memory controller 52, an address multiplexer 54, and a data buffer 56. Memory control unit 50 is further connected to a random access memory as represented by RAM module 58. Memory controller 52 includes the logic for mapping addresses to and from CPU 26 to particular areas of RAM 58. While the personal computer system 10 is shown with a basic 1 megabyte RAM module, it is understood that additional memory can be interconnected as represented in FIG. 2 by the optional memory modules 60 through 64.

A further buffer 66 is coupled between system bus 34 and a planar I/O bus 68. Planar I/O bus 68 includes address, data, and control components respectively. Coupled along planar bus 68 are a variety of I/O adapters and other peripheral components such as display adapter 70 (which is used to drive an optional display 14), a clock 72, nonvolatile RAM 74 (hereinafter referred to as "NVRAM"), a RS232 adapter 76, a parallel adapter 78, a plurality of timers 80, a diskette adapter 82, a PC keyboard/mouse controller 84, and a read only memory (ROM) 86. The ROM 86 includes BIOS which provides the user transparent communications between many I/O devices.

Clock 72 is used for time of day calculations. NVRAM 74 is used to store system configuration data. That is, the NVRAM will contain values which describe the present configuration of the system. For example, NVRAM 74 contains information which describe the capacity of a fixed disk or diskette, the type of display, the amount of memory, etc. Of particular importance, NVRAM 74 will contain data which is used to describe the system console configuration; i.e., whether a PC keyboard is connected to the keyboard/mouse controller 84, a display controller is available or the ASCII terminal is connected to RS232 adapter 76. Furthermore, these data are stored in NVRAM 74 whenever a special configuration program is executed. The purpose of the configuration program is to store values characterizing the configuration of this system to NVRAM 76 which are saved when power is removed from the system.

Connected to keyboard/mouse controller 84 are ports A and B. These ports are used to connect a PC keyboard (as opposed to an ASCII terminal) and mouse to the PC system. Coupled to RS232 adapter unit 76 is an RS232 connector. An optional ASCII terminal can be coupled to the system through this connector.

Specifically, personal computer system 10 may be implemented utilizing any suitable computer such as the IBM PS/2 computer or an IBM RISC SYSTEM/6000 computer, both products of International Business Machines Corporation, located in Armonk, N.Y. "RISC SYSTEM/6000" is a trademark of International Business Machines Corporation and "PS/2" is a registered trademark of International Business Machines Corporation.

Figure 3:
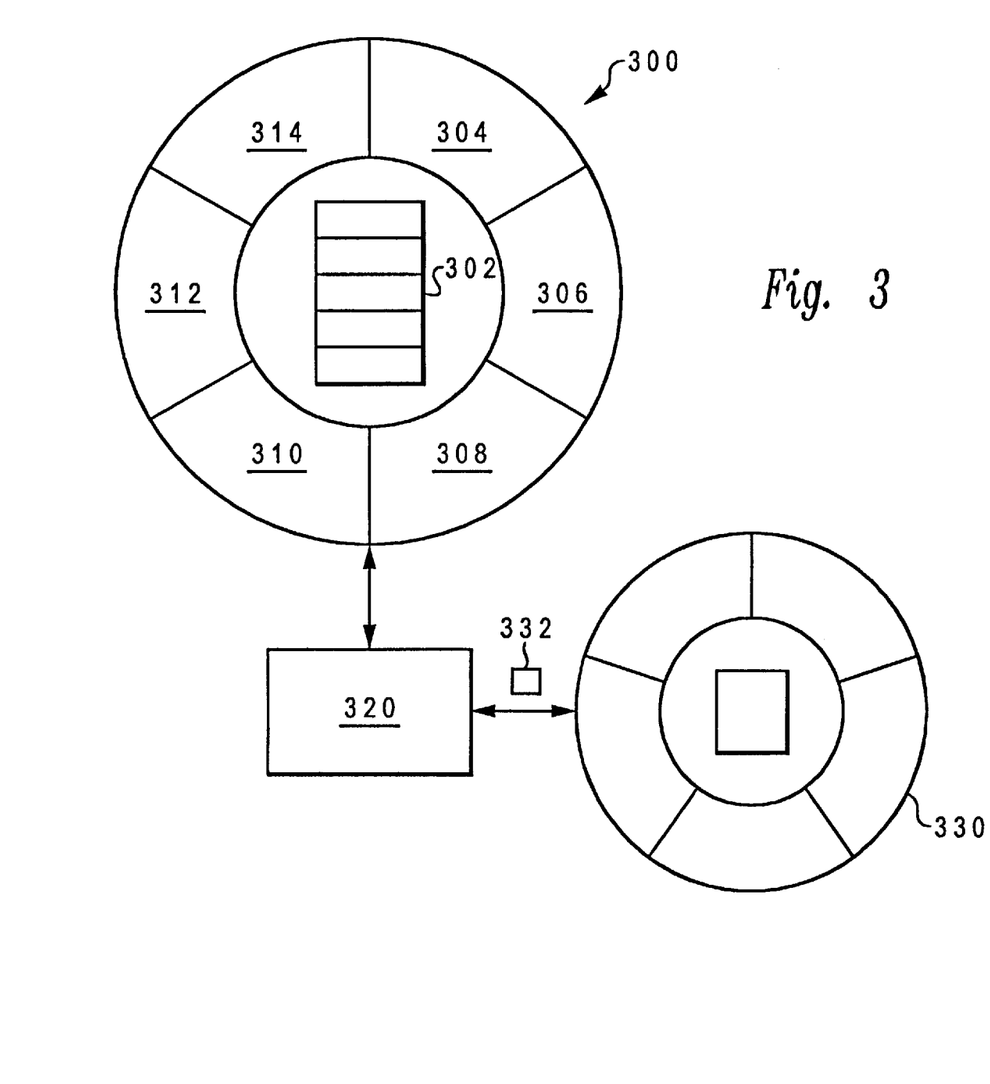
FIG. 3 is a diagram of objects in an object oriented system depicted in accordance with a preferred embodiment of the present invention.

With reference to FIG. 3, a diagram of objects in an object oriented system is depicted in accordance with a preferred embodiment of the present invention. An object encapsulates data and the methods needed to operate on that data. Objects can be represented by a "doughnut diagram" such as shown in FIG. 3. Object data is shown in the center 302 surrounded by the applicable methods 304 to 314. Data 302 may be modified only by the methods of that object. Methods 304–314 are invoked by receiving messages from other objects. A typical object oriented system will have a message router 320 that routes messages between objects. Thus, object 330 causes Method C 308 to be invoked by sending a message 332 to message router 320 that in turn sends message 322 to Method C 308 of object 300.

Object frameworks are constructed to provide a set of objects for application and system developers to use to construct a delivered system. The IBM System Object Model (SOM) framework, for example, provides a language independent set of objects for use in systems development.

Objects are grouped into classes of related objects. The class description contains information relevant to all objects in a class, including a description of instance variables maintained by each of the objects and the available object methods. An object instance is created (or "instantiated") based on that information and has the properties defined in the object class. For example, the object class DOG can include the instance variables "dog_type" and "dog_name" and a "bark" method implementing the response to a bark message. An instance of dog, e.g. ROVER, will maintain the type and name instance variables for itself and will respond to the bark message.

Abstract classes are used to describe the interfaces and methods expected to be used by a class without providing detail on the implementation of those methods. Abstract classes are useful in frameworks where the implementation details are to be left to the implementor. Concrete classes are created as subclasses of abstract classes and implement those classes.

Figure 4:
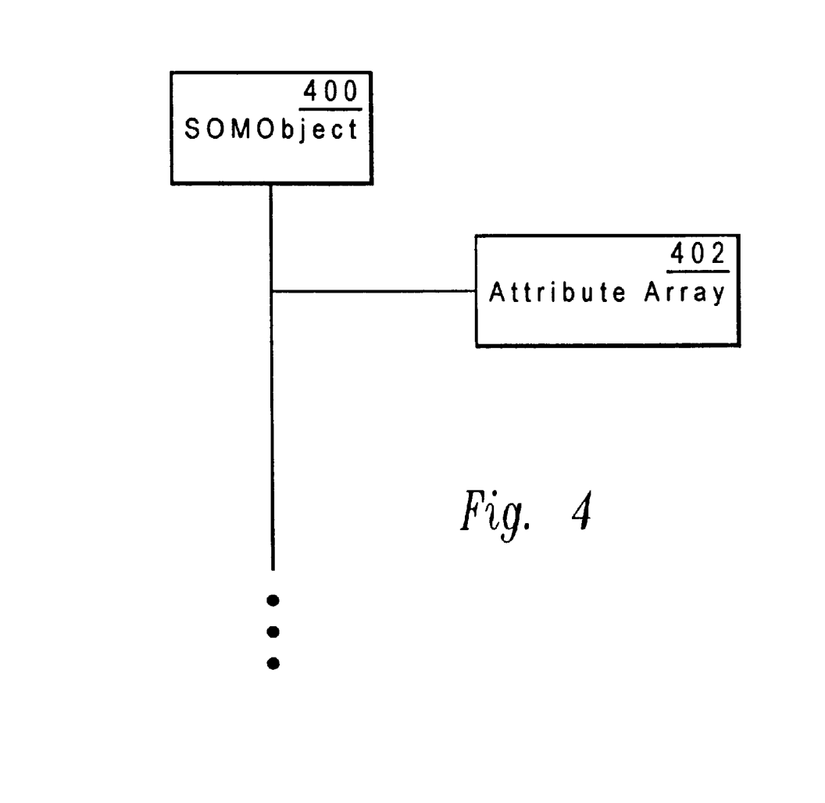
FIG. 4 illustrates a preferred embodiment of the present invention by showing the class hierarchy for an attribute array object using the system object model.

Classes in an object oriented system are often derived from a single base class. This base class is named "SOMobject" in the IBM System Object Model. FIG. 4 illustrates a preferred embodiment of the present invention by showing the class hierarchy for an attribute array object using the system object model.

SOMobject 400 is the base class with attribute array 402 being a subclass of SOMobject 400. Attribute array 402 contains the methods and variables necessary to implement the callback mechanism of the present invention. Because attribute array 402 is a subclass of SOMobject 400, attribute array 402 inherits all methods and variables known to SOMobject 400.

Figure 5:
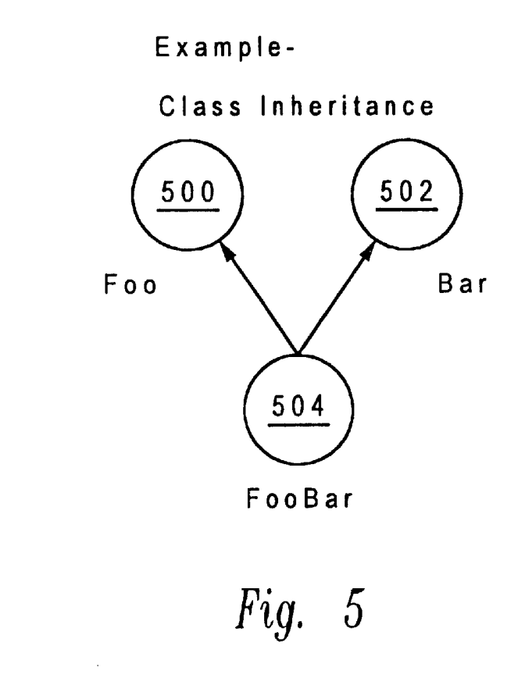
FIG. 5 a diagram of class inheritance in accordance with a preferred embodiment of the present invention.

With reference to FIG. 5, a diagram of class inheritance in accordance with a preferred embodiment of the present invention. A superclass, also called a parent class is a class from which another class inherits methods, attributes, and instance variables. Class 500, Foo, and class 502, Bar, are two superclasses. Class 504, FooBar, is a subclass that inherits from both classes 500 and 502. Class 500 includes a callback attribute array fooCB (not shown) and class 502 includes an attribute array called barCB (not shown). An "array" includes a number of elements in which each element is stored in an array slot, which is indexed by an integer.

Figure 6:
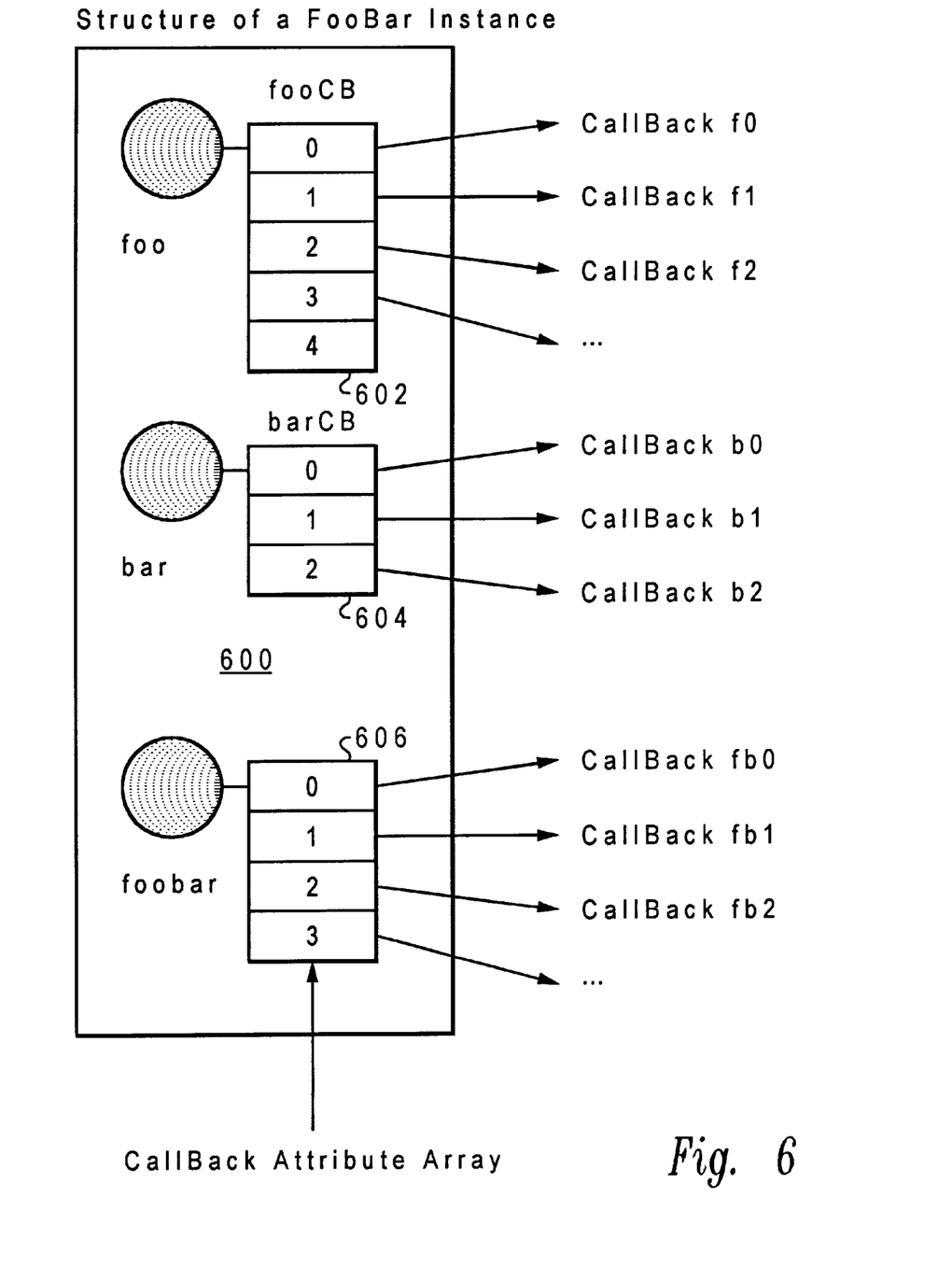
FIG. 6 is diagram of a structure for a subclass instance in accordance with a preferred embodiment of the present invention.

All instances of class 500 will automatically include a fooCB array and all instances of class 502 will include a barCB array. All instances of 504 will automatically have fooCB and barCB arrays, as depicted in FIG. 6. In addition, instance 600, an instance of class 504, also may include callbacks specific to instance 600. This object oriented instance enables a program to manage callbacks logically in their respective classes and simplifies callbacks in accordance with a preferred embodiment of the present invention.

With reference to FIG. 6, a structure of a subclass instance in accordance with a preferred embodiment of the present invention. Instance 600 includes callback attributes arrays 602, 604, and 606. Callback attribute array 602 is an attribute array for callbacks specific for class 500 while attribute array 604 includes callbacks for class 502. Attribute array 606 includes callback for this specific instance of class 504. As can be seen with reference to FIG. 6, each attribute array contains a number of slots identified by integers.

In accordance with a preferred embodiment of the present invention, an attribute array containing slots, instead of a hash table, is employed to hold the address of the callback procedure. This attribute array allows the registration of the callback to employ a simple integer as the callback identification. The integer serves as an index into the slots in attribute array in which the address of the callback procedure can be retrieved directly from the index attribute array. In this manner, the use of a string along with the overhead necessary to process the string is avoided in accordance with a preferred embodiment of the present invention.

Figure 7:
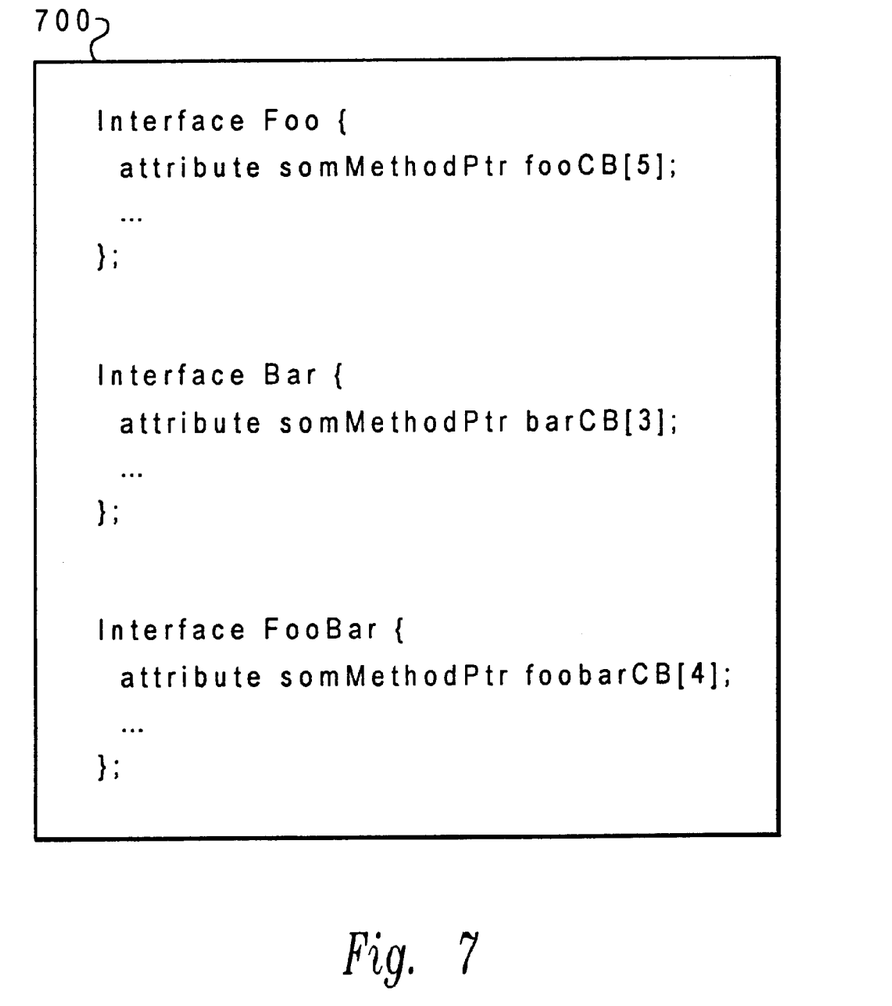
FIG. 7 is a diagram of psuedo code for declaring the attribute array in a SOM subclass is depicted in accordance with a preferred embodiment of the present invention.

With reference to FIG. 7, a diagram of psuedo code for including the attribute array is depicted in accordance with a preferred embodiment of the present invention. In block 700, the attribute array fooCB(5) is declared to be an instance variable of class Foo.

The invocation of a callback includes using the class identifier and the integer identify the slot in the attribute array containing the address of the subroutine to be invoked in accordance with a preferred embodiment of the present invention.

Figure 8:
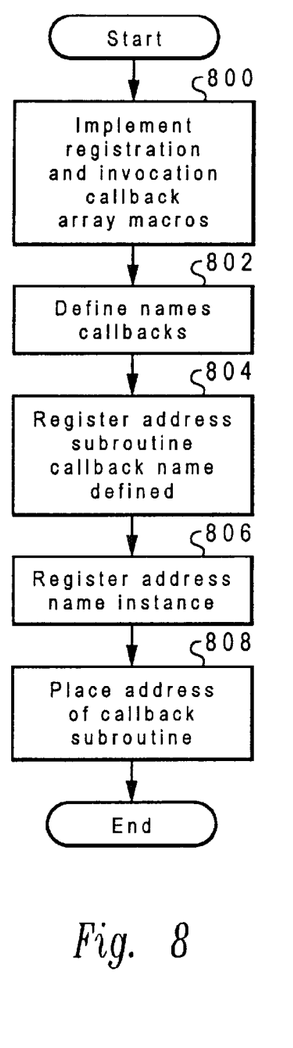
FIG. 8 is a flowchart of a process for utilizing a attribute array is depicted in accordance with a preferred embodiment of the present invention.

In FIG. 8, a flowchart of a process for utilizing an attribute array is depicted in accordance with a preferred embodiment of the present invention. The process begins by implementing the registration and invocation of the callback array as macros (step 800). Next, the names of the callbacks together with the class are defined (step 802). In accordance with a preferred embodiment of the present invention, the names of the callbacks are defined to be unique integer values up to the size of the callback array. The definition of the name is included with the declaration of the class. This insures efficient callback name management.

By including declaration files, the index values of the names are available for use in determining the address of a subroutine. A declaration file contains the association tween a name and its unique integer value. The named callback subroutine may be implemented in the usual manner known to those of ordinary skill in the art. Thereafter, the address of the subroutine is registered with the callback name defined in the class registration (step 804). The address and the name of the instance is registered (step 806). Once registered, the address of the callback subroutine is placed into the indexed position of the array as defined by a callback registration process (step 808).

Figure 9:
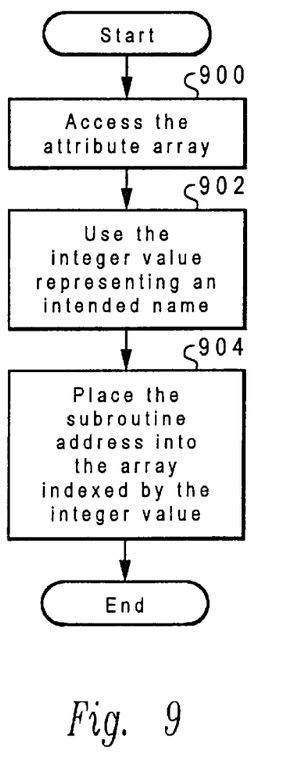
FIG. 9 is a flowchart of a process for registering a callback in accordance with a preferred embodiment of the present invention.

With reference now to FIG. 9, a flowchart of a process for registering a callback is depicted in accordance with a preferred embodiment of the present invention. The process begins by accessing the attribute array (step 900). Thereafter, the process uses the integer value representing an internal name for the callback subroutine (step 902). The process then places the subroutine address into the array indexed by the integer value (step 904) with the process terminating thereafter.

Figure 10:
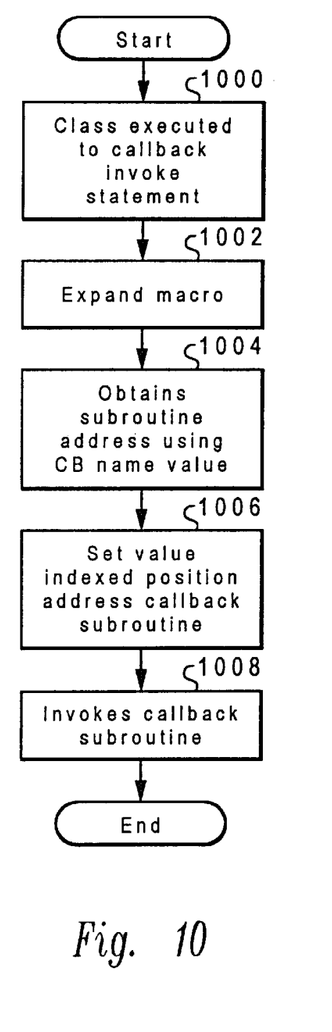
FIG. 10 is a flowchart of a process of invocation of an attribute array is depicted in accordance with a preferred embodiment of the present invention.

With reference now to FIG. 10, a flowchart of a process of invocation of an attribute array is depicted in accordance with a preferred embodiment of the present invention. The process begins by a class being executed to a callback invoke statement, (CBinvoke) (step 1000). The macro is expanded to an invocation to the subroutine address stored in the index position (step 1002). The process then obtains the subroutine address by using the CB name value as an index into the attribute array (step 1004). The process then utilizes the value in the indexed position as the address of the callback subroutine (step 1006). The process then invokes the callback subroutine (step 1008). Since only indexing is employed to find the address of the callback subroutine, the speed of the callback subroutine invocation is improved.

Figure 11:
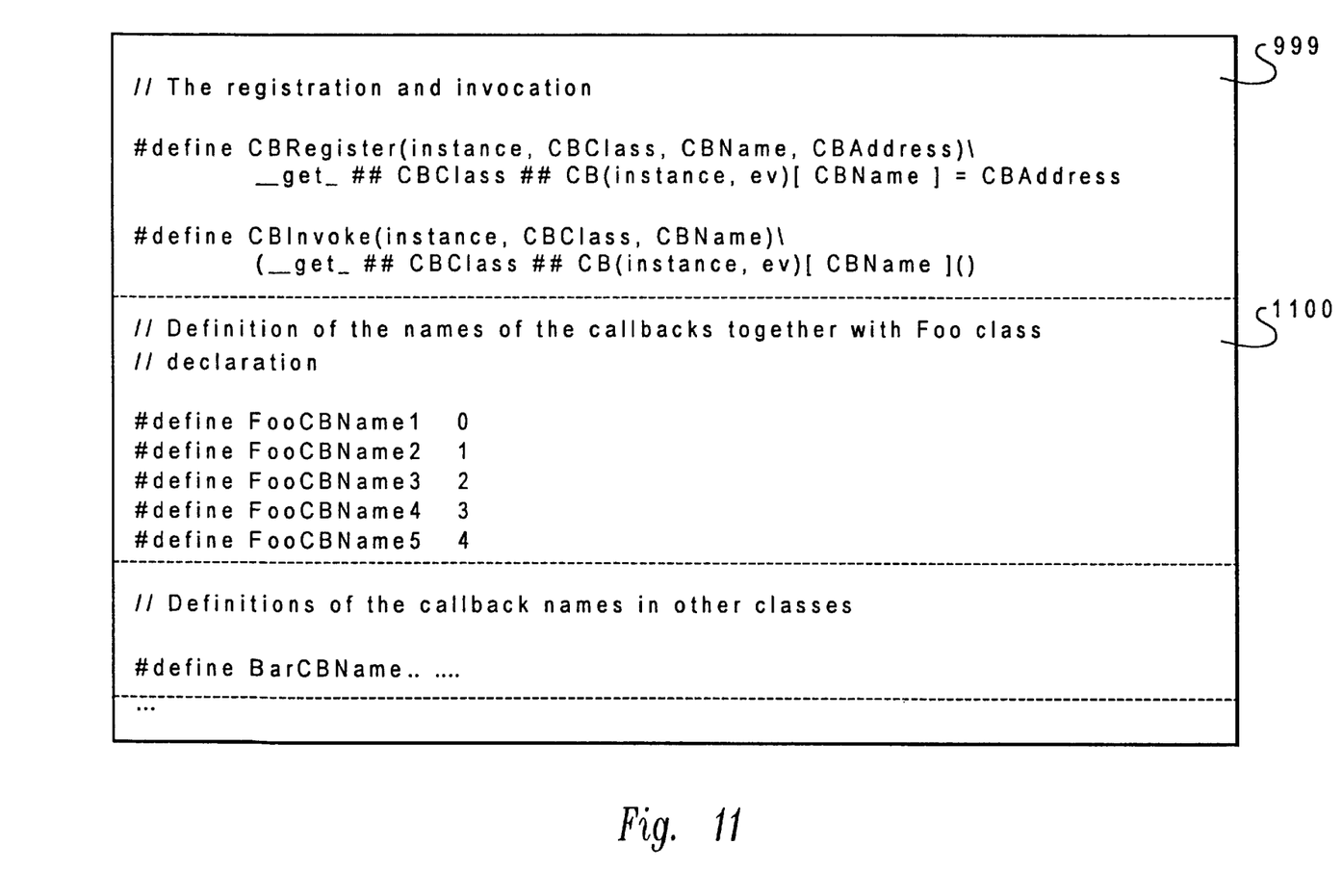
FIG. 11 is a diagram of pseudo code for initializing an attribute array is depicted in accordance with a preferred embodiment of the present invention.

With reference to FIG. 11, a diagram illustrating the initialization of an attribute array is depicted in accordance with a preferred embodiment of the present invention. In particular, block 1100 depicts the name and integer value declaration for class 500 from FIG. 5. Block 999 depicts the registration and invocation of the callback. As can be seen, the registration and invocation are implemented as macros. The names of the callbacks are defined together with the Foo class, class 500 in FIG. 5. As can be seen in block 1100, the callback names are defined with integer values. In addition, block 1100 may include definition of callback names for other classes such as Bar, class 502, and Foobar, class 504.

Figure 12:
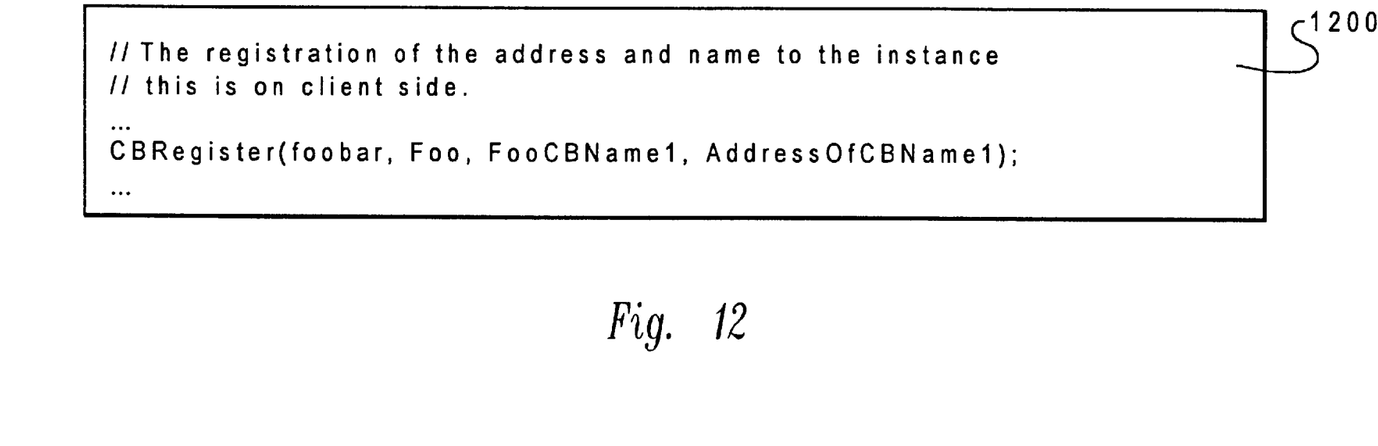
FIG. 12 is a diagram of the registration of an instance is depicted in accordance with a preferred embodiment of the present invention.

With reference to FIG. 12, a diagram of the registration of an instance is depicted in accordance with a preferred embodiment of the present invention. Block 1200 depicts code for registering the address and name of the callback to the instance. The registration is performed on the client side in accordance with a preferred embodiment of the present invention.

Figure 13:
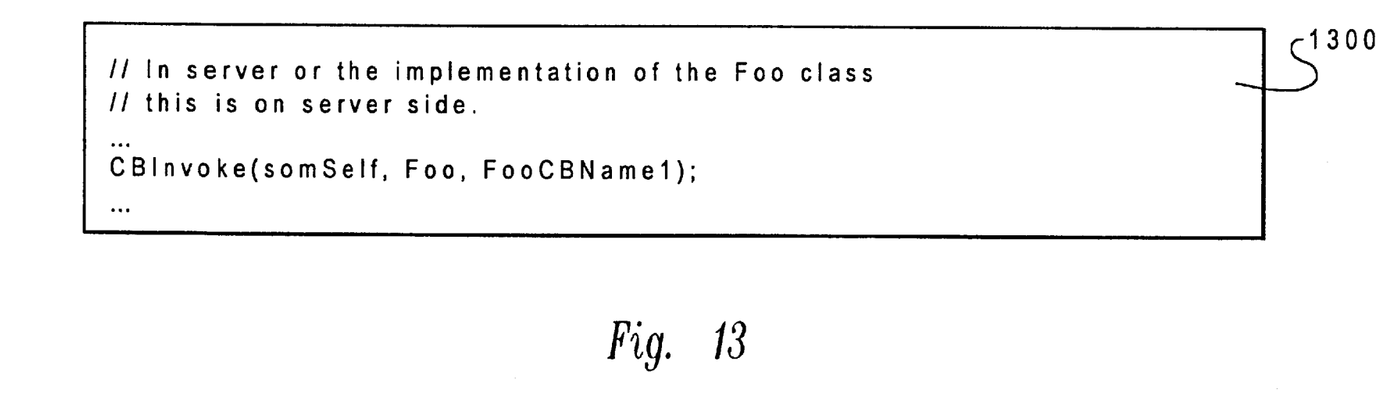
FIG. 13 is a diagram of an invocation of a callback subroutine is depicted in accordance with a preferred embodiment of the present invention.

With reference now to FIG. 13, a diagram of the invocation of an attribute array is depicted in accordance with a preferred embodiment of the present invention. Block 1300 depicts code for implementating Foo class, class 500. The class implemented by including a CB invoked statement.

The processes depicted in FIGS. 5–13 may be implemented by those of ordinary skill in the art within the data processing system depicted in FIGS. 1 and 2. The processes of the present invention also may be implemented in a program storage device that is readable by a data processing system, wherein the program storage device encodes data processing system executable instructions coding for the processes of the present invention. The program storage device may take various forms including, for example, but not limited to a hard disk drive, a floppy disk, an optical disk, a ROM, and an EPROM, which are known to those skilled in the art. The processes stored on a program storage device are dormant until activated by using the program storage device with the data processing system. For example, a hard drive containing data processing system executable instructions for the present invention may be connected to a data processing system; a floppy disk containing data processing system executable instructions for the present invention may be inserted into a floppy disk drive in the data processing system; or a ROM containing data processing system executable instructions for the present invention may be connected to the data processing system via a card or adapter connected to an I/O slot.

While the invention has been particularly shown and described with reference to a preferred embodiment, it will be understood by those skilled in the art that various changes in form and detail may be made therein without departing from the spirit and scope of the invention.

What is claimed is:

1. A method in a data processing system for invoking a subroutine from within an object in an object oriented system, wherein the object oriented system includes a plurality of subroutines and a plurality of classes, wherein a subroutine from the plurality of subroutines is called from within an object using an address for the subroutine, the method comprising:

creating a plurality of callback arrays associated with an object within the object oriented system, each callback array belonging to a different class within the plurality of classes and having at least one slot identified by an integer, the at least one slot containing an address for one of the plurality of subroutines;

accepting a class identifier to identify one of the plurality of callback arrays;

accepting an integer to select a slot within the callback array identified by the class identifier; and calling a subroutine using the address located within the selected slot of the identified callback array, wherein the complexity of managing callbacks is reduced.

2. A data processing system, having a plurality of objects in an object oriented system, for dynamically invoking subroutines in a number of objects within the plurality of objects from a first object, the data processing system comprising:

a plurality of subroutines, each subroutine having an address utilized to call the subroutine;

an object including a plurality of callback arrays, each callback array belonging to a different class and having at least one slot identified by an integer, and via the at least one slot having an address for one of the plurality of subroutines; and input means for receiving a class identifier and an integer;

identification means for identifying a callback array from the plurality of callback arrays utilizing the class identifier and for identifying a slot within the identified callback array utilizing the integer; and invocation means for invoking a subroutine associated with the slot identified by the integer utilizing an address located within the identified slot, wherein the complexity of the required callback arrays is minimized.

3. The data processing system of claim 2, wherein the input means receives a class identifier and an integer from a source external to the object.

4. The data processing system of claim 2, wherein the input means receives the class identifier and the integer from the object.

5. The data processing system of claim 2, wherein the plurality of callback arrays is three.

6. The data processing system of claim 2, further comprising means for creating a callback array within the object.

7. The data processing system of claim 2, wherein the creation means includes for registering a subroutine with a slot in a callback array.

8. A storage device readable by a data processing system and encoding data processing system executable instructions for invoking a subroutine from within an object in an object oriented environment the data processing system comprising:

means for locating an object including a plurality of associated callback arrays each belonging to a different class;

means for accepting a class identifier to identify one of the plurality of callback arrays;

means for accepting an integer to select a slot within the callback array identified by the class identifier; and means for calling a subroutine using the address located within the selected slot of the identified callback array.

9. The storage device of claim 8, wherein the storage device is a hard disk drive.

10. The storage device of claim 8, wherein the storage device is a ROM for use in a data processing system.

11. The storage device of claim 8, wherein the storage device is a floppy diskette.

* * * * *